(No Model.)

C. O. WHITE & M. B. LLOYD.
REEL.

No. 554,226.  Patented Feb. 4, 1896.

Witnesses.
J. Jessen.
O. G. Hawley.

Inventors
Clarence O. White
Marshall B. Lloyd
By Paul A. Merwin Attys.

(No Model.) 2 Sheets—Sheet 2.

C. O. WHITE & M. B. LLOYD.
REEL.

No. 554,226. Patented Feb. 4, 1896.

Witnesses
G. E. Dipple
F. L. Lyon

Inventors
Clarence O. White
Marshall B. Lloyd
By Paul & Merwin Attys.

UNITED STATES PATENT OFFICE.

CLARENCE O. WHITE AND MARSHALL B. LLOYD, OF MINNEAPOLIS, MINNESOTA.

REEL.

SPECIFICATION forming part of Letters Patent No. 554,226, dated February 4, 1896.

Application filed December 5, 1892. Renewed July 9, 1895. Serial No. 555,448. (No model.)

*To all whom it may concern:*

Be it known that we, CLARENCE O. WHITE and MARSHALL B. LLOYD, of Minneapolis, county of Hennepin, State of Minnesota, have invented certain Improvements in Reels, of which the following is a specification.

This invention relates to improvements in reels or spools designed for holding wire, cord, or other material and permitting it to be unwound therefrom as it is required for use, and the objects we have in view are to provide a reel or spool upon which wire or other material may be placed and from which it may be drawn by machinery as it is required for use without any liability of snarling, twisting, or catching, and the invention consists generally in a reel or spool provided with a supporting-plate, a central tube or opening and a revoluble wire or thread carrier through which the wire or material is passed from the coil to the central tube.

The invention consists, further, in the constructions and combinations, all as hereinafter described, and particularly pointed out in the claims, and will be more readily understood by reference to the accompanying drawings, in which—

Figure 1:
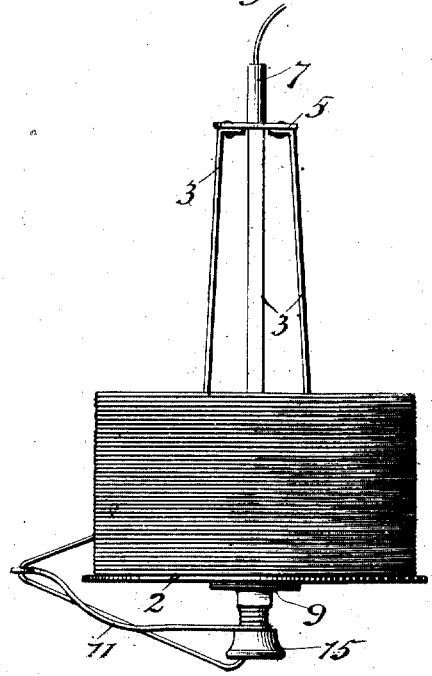
Figure 2:
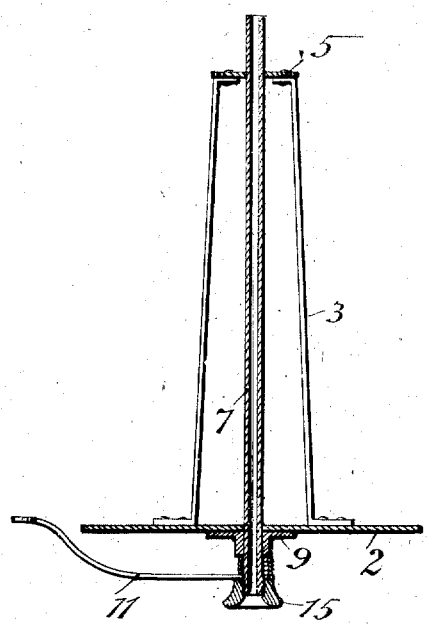
Figure 3:
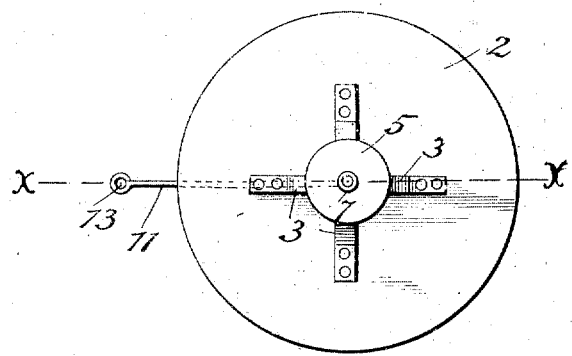
Figure 4:
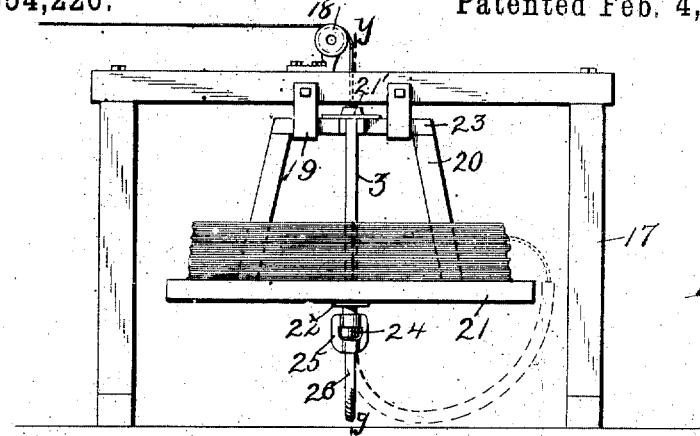
Figure 6:
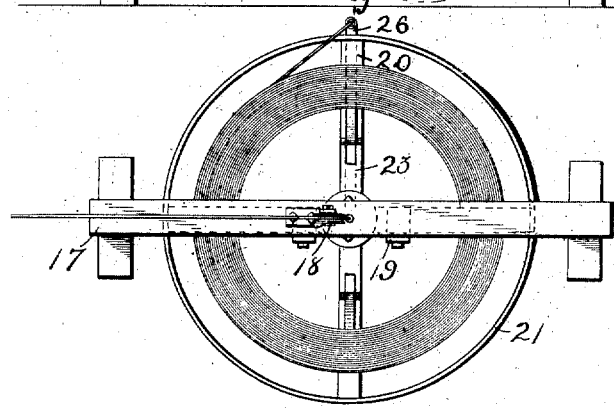
Figure 5:
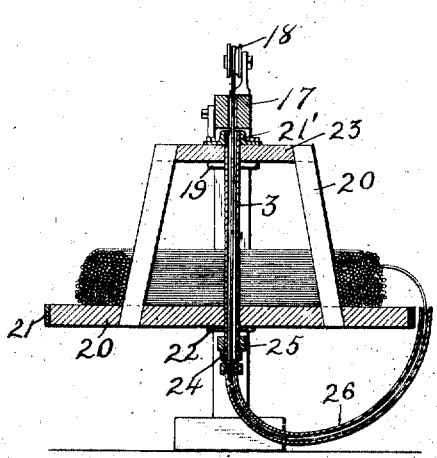

Figure 1 is a side elevation of a spool or reel embodying our invention and showing a coil of wire thereon. Fig. 2 is a vertical section of the same on line $x\ x$ of Fig. 3. Fig. 3 is a plan view. Figs. 4, 5 and 6 are similar views showing a non-revolving reel, Fig. 5 being a section on line $y\ y$ of Fig. 4.

In the drawings, 2 represents the suitable supporting or base plate of the reel, preferably of circular form and of any suitable size. Arranged upon this plate are the standards 3, which are preferably secured to said plate at their lower ends and are secured at their upper ends to a plate 5, said standards being arranged with their upper ends somewhat nearer together than their lower ends, thus forming a central support, upon which a cord or wire or other material may be fastened. The inclined arrangement of the standards facilitates the placing of wire or other material upon the reel. A tube 7 is arranged centrally in said reel and is preferably supported in said plates 5 and 2. A collar 9 may also be arranged upon said tube at the inside of said plate. The tube 7 preferably projects a short distance below said collar 9 and a revoluble wire or thread carrier 11 is preferably arranged upon said tube and extends downward beyond the outer edge of the said plate 2, this outer end being preferably arranged slightly above or on a level with the upper surface of said plate. The outer end of said thread or wire carrier is provided with an eye 13, through which the thread or wire passes. The inner end of said carrier consists preferably of a series of coils, which form a yielding bearing between said carrier and the collar 9 and permit said carrier to yield slightly while holding it in a substantially horizontal position. The lower end of the tube 7 is preferably screw-threaded and a guide-ring 15, provided with the flaring or funnel-shaped opening, is secured upon the lower end of said tube against said carrier 11 and holds the same in position. The wire or thread after passing through the eye in said carrier is passed into said guide 15 and through the tube 7 and is drawn out of the upper end thereof and is then carried to the machine or other device with which it is to be used.

The reel is in use supported from above, for example, as shown in Fig. 4.

In practice we place a coil of wire or other material upon the plate or base 2 and carry the end thereof through said carrier 11 and then through the guide 15 and tube 7, so that the wire is first passed down and then up through the center of the coil or bundle. In this manner the wire is drawn downward from the coil or bundle, so that there is no tendency to lift any of the wire from the bundle with the running wire, as it is usually the case when wire or material of other kinds is fed in from an ordinary reel or spool.

We may modify the above-described construction, as shown in Figs. 4, 5, and 6, where we provide a strong frame or horse 17, having upon its cross-beam the pulley 18 and the depending clips 19, adapted to support the reel-body 20, which is substantially that shown in the preceding figures, except that it is made of wood throughout and somewhat heavier, and a tire 21 is provided upon the base. The tube 3 is the same and is held in the collars 21' and 22 provided on the crosspiece 23 and the base of the reel-body. On the lower end of the tube we arrange the collar 24, upon which the swivel 25 is adapted to revolve. To this swivel we attach the curved tube or pipe 26, and the wire is taken off the bundle from its circumference, carried down this tube, up through the swivel-joint, and through the central tube 3 and over the pulley 18. The pull upon the wire revolves the curved tube to take the wire from the reel, which, with the bundle of wire, is stationary and does not revolve. This reel merely hangs from the clips, and consequently when empty may be readily slipped off the same to be replaced by a reel having a new bundle of wire.

With this construction it is practically impossible for the wire or thread to become tangled or kinked, and it is thus always free to be drawn in from the reel by the machine or device with which it is to be used.

Having thus described our invention, we claim as new and desire to secure by Letters Patent—

1. The combination in a reel or spool, of a supporting plate or base, a central tube extending through said plate and through the center of the bundle of material, when the device is in use, and means for guiding the wire or material through said tube, substantially as described.

2. In a reel or spool of the class described, the combination with a supporting-plate and guide-tube extending through said plate, of a revoluble carrier, and means for guiding the material from said reel through said tube.

3. The reel or spool provided with a central tube, and means for guiding the material from said reel through said tube.

4. The combination with the plate 2 and standards 3 and plate 5, of a central tube 7, a revoluble carrier 11, and the guide 15, substantially as described.

5. The combination in a reel or spool, of a support, the reel-body consisting of a base or plate and standards, means for hanging said body from said support, a central tube extending up through said body, and a revoluble carrier revoluble about the lower end of said tube to conduct the wire from the reels to said central tube without twisting the wire, substantially as described.

In testimony whereof we have hereunto set our hands this 13th day of October, 1892.

CLARENCE O. WHITE.
MARSHALL B. LLOYD.

In presence of—
F. S. LYON,
A. C. PAUL.